United States Patent [19]
Kwon et al.

[11] Patent Number: 5,771,753
[45] Date of Patent: Jun. 30, 1998

[54] STOPPER FOR ROBOT ROTARY ARTICULATION

[75] Inventors: Jung wook Kwon; Chan-seob Oh, both of Suwon, Rep. of Korea

[73] Assignee: Samsung Electronics Co., Ltd., Kyungki-do, Rep. of Korea

[21] Appl. No.: 733,932

[22] Filed: Oct. 18, 1996

[30] Foreign Application Priority Data

Jul. 30, 1996 [KR] Rep. of Korea .................... 96-22883

[51] Int. Cl.$^6$ ....................................... G05G 1/04
[52] U.S. Cl. ................. 74/526; 74/469; 192/149
[58] Field of Search ............... 74/526, 527, 469; 192/139, 142 R, 149, 469

[56] References Cited

U.S. PATENT DOCUMENTS

| | | | |
|---|---|---|---|
| 2,767,681 | 10/1956 | Pontius | 116/125 |
| 4,295,555 | 10/1981 | Kamm | 74/469 X |
| 4,313,350 | 2/1982 | Keller et al. | 74/526 |
| 4,317,253 | 3/1982 | Gut | 192/30 W |
| 4,635,502 | 1/1987 | George | 74/526 X |
| 4,828,094 | 5/1989 | Torri et al. | 192/149 X |
| 4,892,252 | 1/1990 | Bruninga | 239/205 |
| 5,335,563 | 8/1994 | Yamamoto et al. | 74/512 |
| 5,473,961 | 12/1995 | Jackson et al. | 74/526 |

*Primary Examiner*—Vinh T. Luong
*Attorney, Agent, or Firm*—Burns, Doane, Swecker & Mathis, LLP

[57] ABSTRACT

A stopper for robot rotary articulation limits the rotation angle of a shaft where a protrusion is formed. The stopper includes a first ring-shaped bush member, a second bush member, having an inner diameter smaller than that of the first bush member, connected to an inner circumference of the first bush member to form a step surface against the first bush member, and rotatably supported by inserting the shaft therein, a first stop protrusion extending from an inner surface of the first bush member in a radial direction thereof and a second stop protrusion protruded from an outer circumferential surface of the second bush member, in which the protrusion of the shaft during rotation of the shaft slides against the step surface and contacts with the first stop protrusion, to thereby rotate the stopper, and the second stop protrusion contacts with a protrusion fixed to a housing of a robot rotary articulation to thereby stop rotation of the shaft and stopper. Accordingly, an operation region of 360 degrees or more can be ensured, and the wide contact area of the outer circumference of the shaft can prevent rotation failure of the stopper.

3 Claims, 7 Drawing Sheets

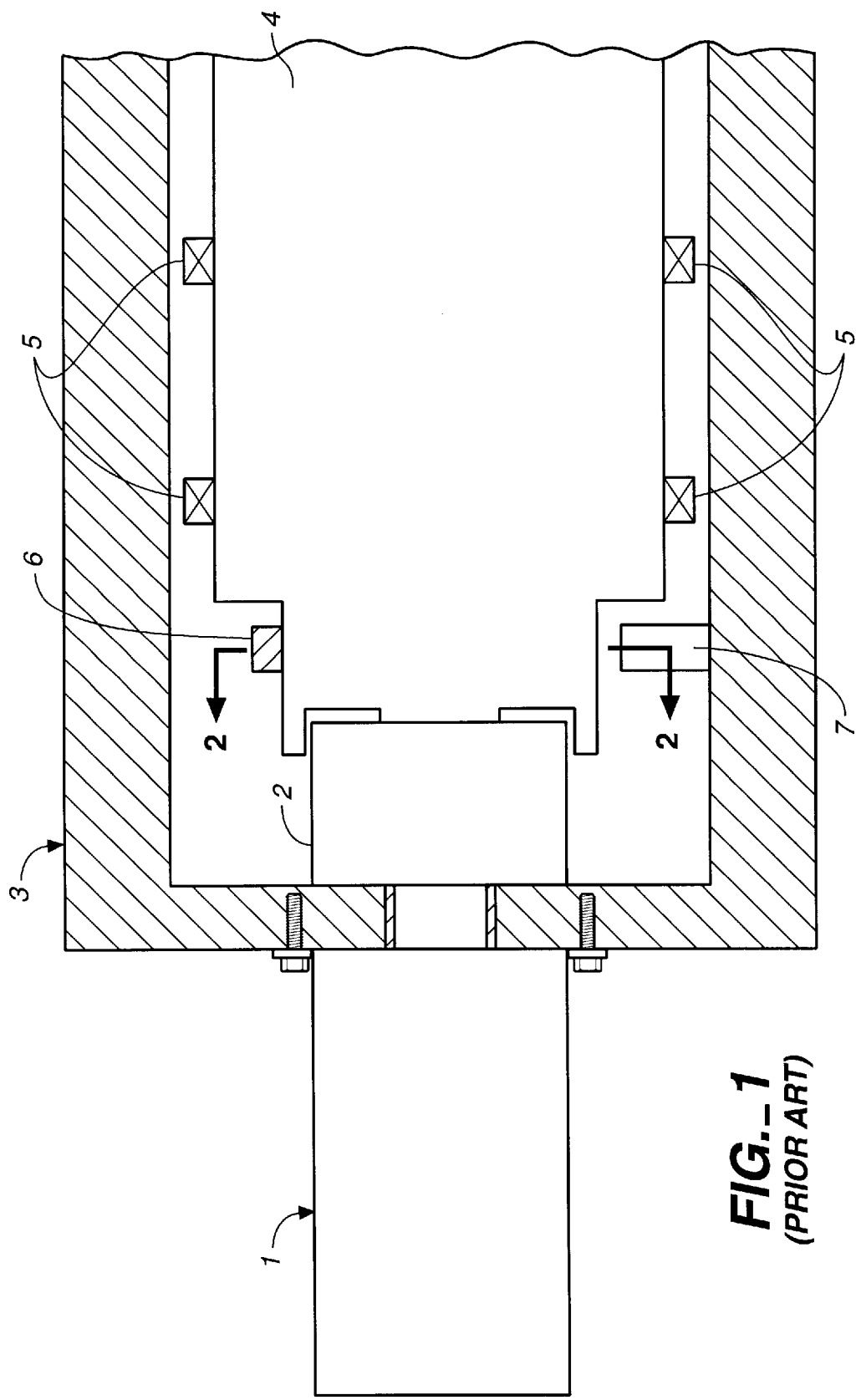
FIG._1
(PRIOR ART)

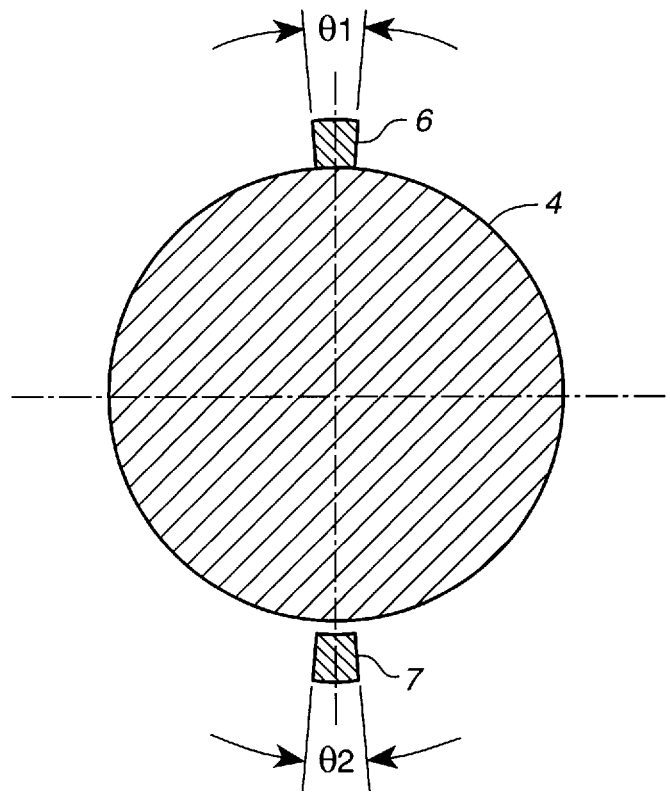
FIG._2
*(PRIOR ART)*
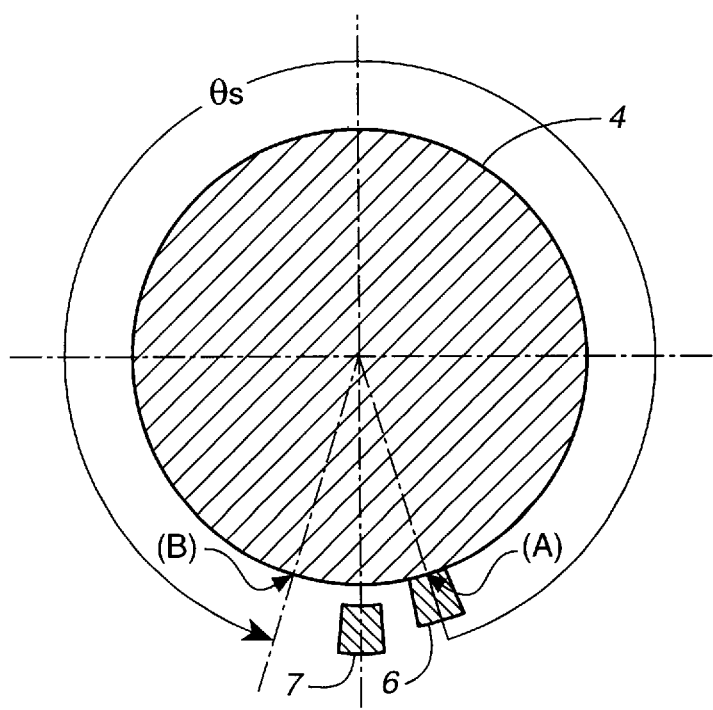
FIG._3
*(PRIOR ART)*

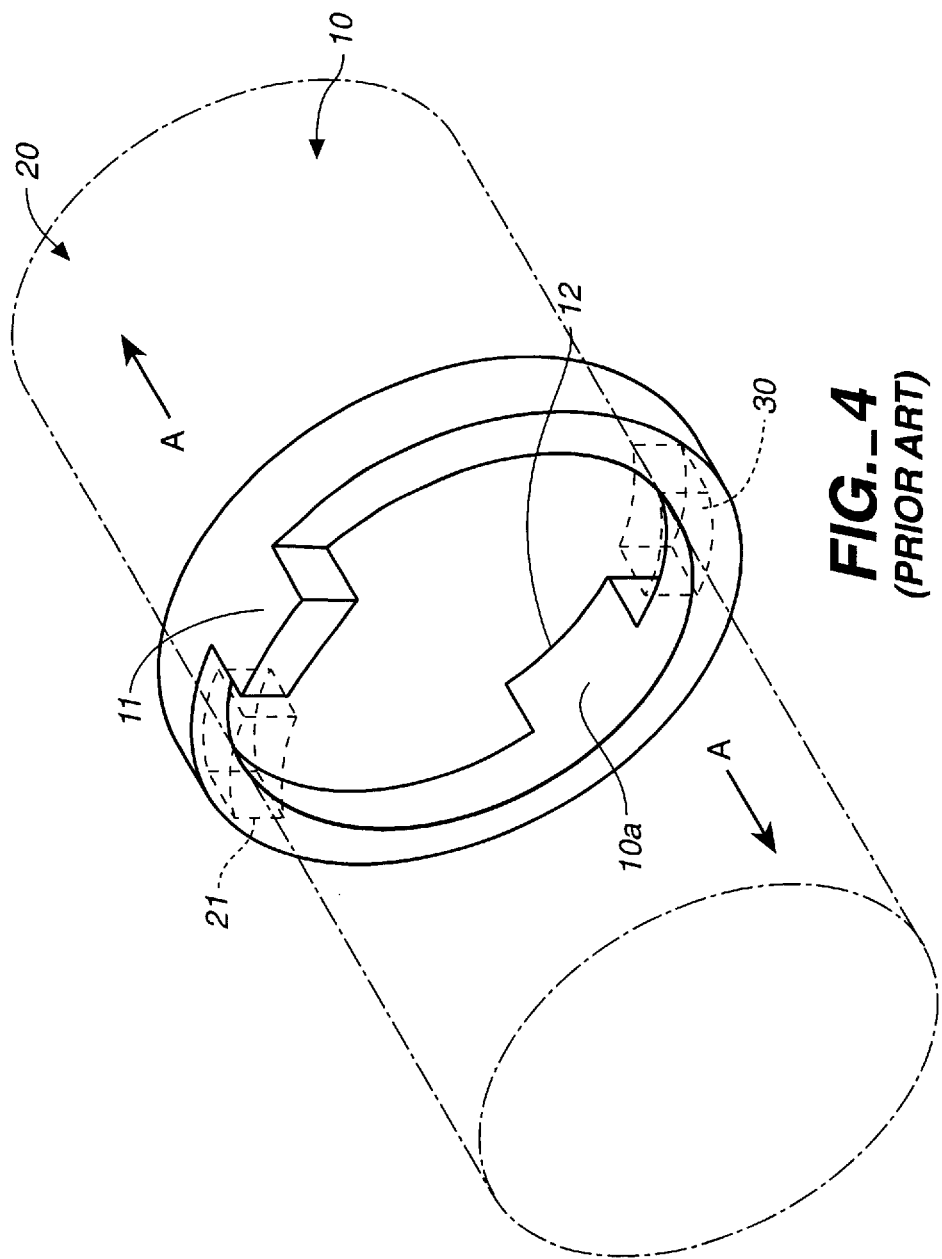
FIG._4
(PRIOR ART)

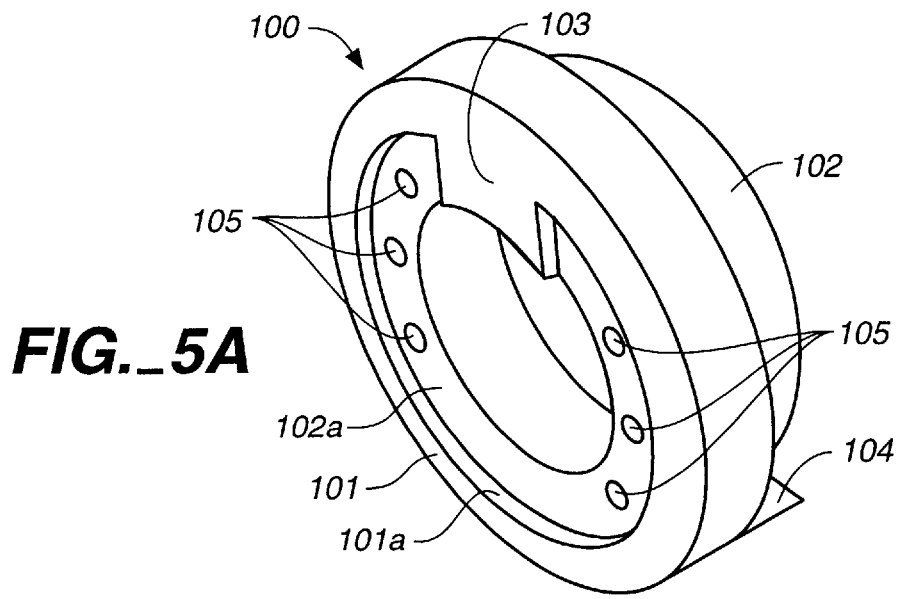
FIG._5A
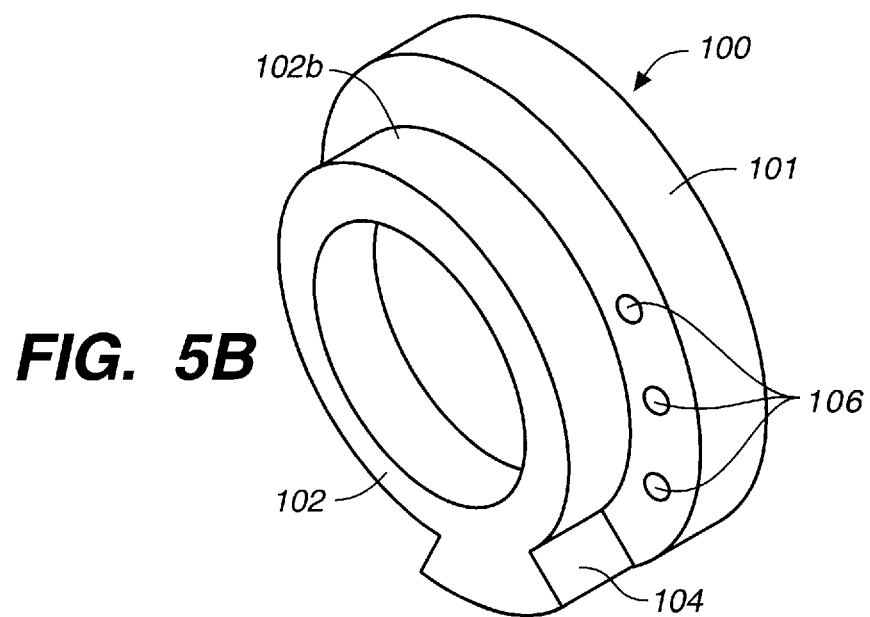
FIG. 5B

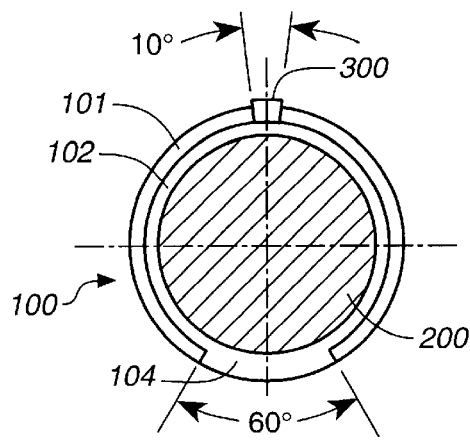
FIG._6A
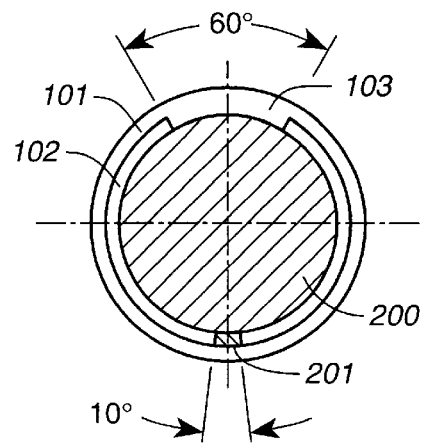
FIG._6B
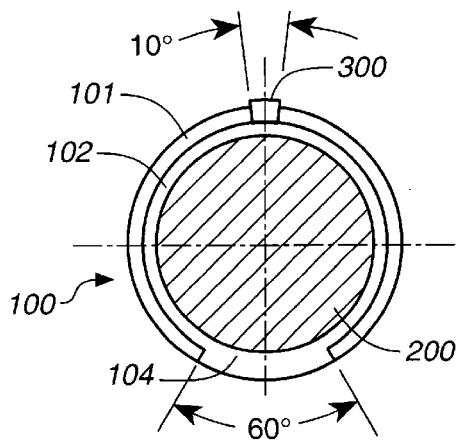
FIG._7A
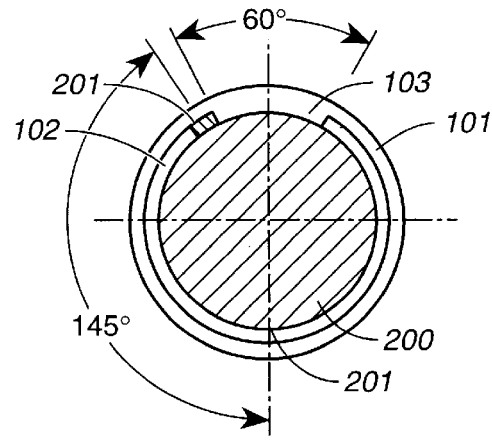
FIG._7B
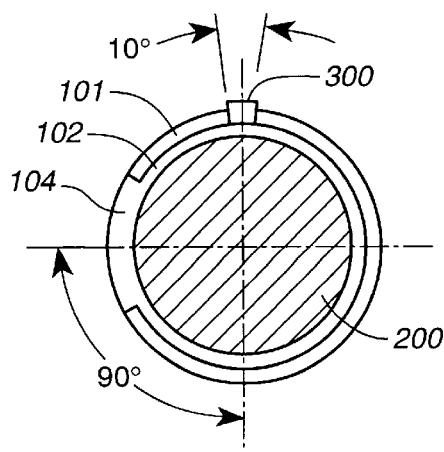
FIG._8A
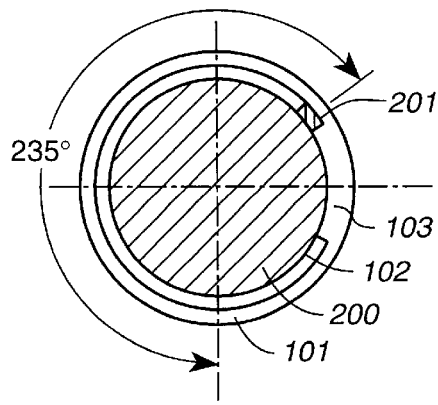
FIG._8B

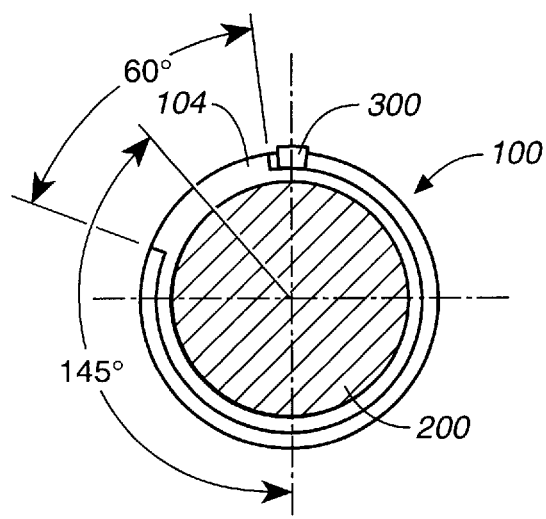
FIG._9A
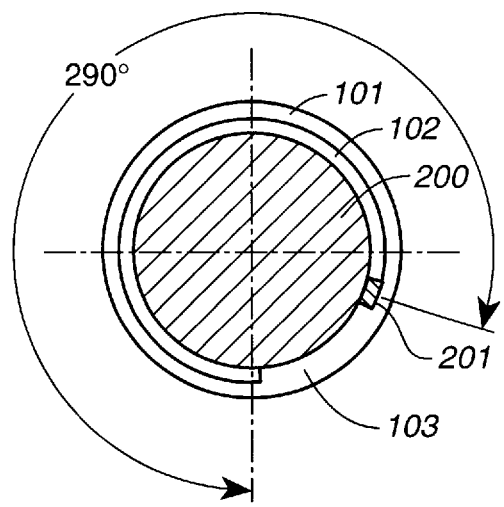
FIG._9B
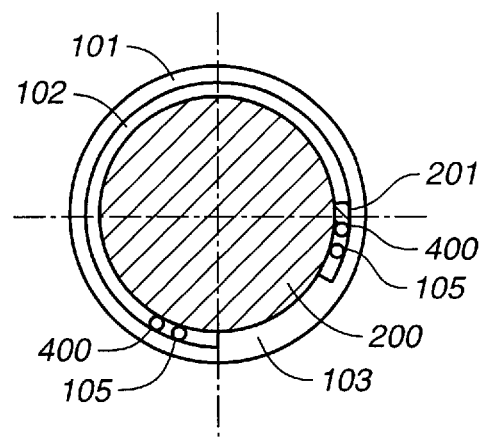
FIG._10

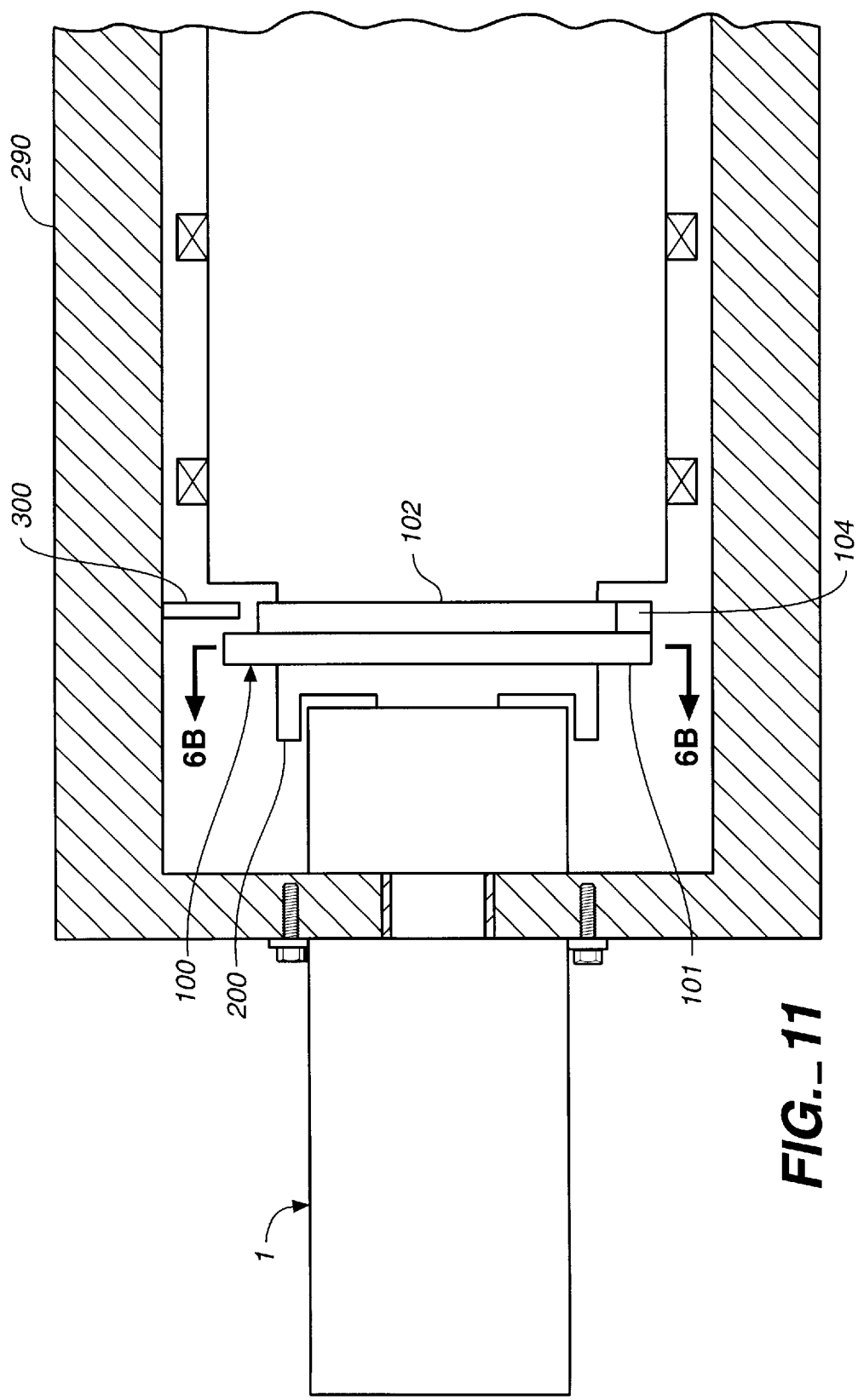
FIG._11

STOPPER FOR ROBOT ROTARY ARTICULATION

BACKGROUND OF THE INVENTION

1. Field of the Invention

The present invention relates to a stopper for a robot rotary articulation for limiting an extent in which a robot rotary articulation rotates, and more particularly, to a stopper capable of being used for the rotary articulation of the robot having a rotation shaft in which a rotation angle is 360 degrees or more.

2. Description of the Prior Art

In a general structure of a rotary articulation of an industrial robot, as shown in FIG. 1, a decelerator 2 is connected to a motor 1 for generating power and the decelerator 2 is rotatably connected to a shaft 4 installed rotatably in a housing 3. Also, the shaft 4 is supported by a plurality of bearings 5.

From a circumference of the shaft 4, a rotary stopper 6 protrudes in a radial direction thereof. On the inside wall of the housing 3, a fixing stopper 7 blocking the rotary stopper 6 is formed. The rotary stopper 6 and fixing stopper 7 are brake means for preventing rotation of a robot which is deviated from an operation region.

In the above rotary articulation, when rotation force of the motor 1 is transferred to the shaft 4 through the decelerator 2, the shaft 4 rotates. Here, the rotary stopper 6 formed on the shaft 4 also rotates and stops the rotation upon contacting the fixing stopper 7 according to a predetermined operation extent.

However, the conventional stoppers 6 and 7, as shown in FIG. 2, have predetermined angles θ1 and θ2. Although the thickness of both the rotary stopper 6 and the fixing stopper 7 is minimized, a rotation angle θs of the shaft 4 cannot exceed 360 degrees, as shown in FIG. 3. Accordingly, in order to change rotation position A of the shaft 4 to rotation position B thereof, the shaft 4 should rotate counterclockwise, which lengthens operation time and deteriorates operation efficiency.

Meanwhile, to solve the above problems, as shown in FIG. 4, a stopper capable of ensuring an operation region of 360 degrees or more has been proposed.

Referring to FIG. 4, a shaft 20 is rotatably inserted into an annular member 10 having first and second protrusions 11 and 12 which protrude in opposite directions.

When the shaft 20 initially rotates, the stationary, the annular member 10 rotates as soon as a rotation protrusion 21 formed on the shaft 20 contacts the first protrusion 11. Then, when the second protrusion 12 contacts a fixing protrusion 30 formed on a housing (not shown), the shaft 20 and the annular member 10 can no longer rotate.

The above stopper can ensure a rotation extent of 360 degrees or more. However, the annular member 10 whose inner circumferential surface 10a contacts with an outer circumferential surface of the shaft 20 rotates without any special guiding means. As the annular member 10 rotates, centrifugal force concentrates in the first and second protrusions 11 and 12. Accordingly, since the annular member 10 slants toward the direction of arrows A or becomes eccentric, whereby the annular member 10 is tightly fitted with the outer circumference of the shaft 20, and operation may fail.

SUMMARY OF THE INVENTION

Accordingly, it is an object of the present invention to provide a stopper for a robot rotary articulation having a structure in which the robot rotary articulation can ensure an operation region of 360 degrees or more, and at the same time, operation can be performed without fail.

To accomplish the above object of the present invention, there is provided a stopper for a robot rotary articulation, for limiting the rotation angle of a shaft where protrusion is formed comprising: a first ring-shaped bush member; a second bush member, having an inner diameter smaller than that of the first bush member, connected to an inner circumference of the first bush member to form a step surface against the first bush member, and rotatably supported by inserting the shaft therein; a first stop protrusion extending from an inner surface of the first bush member in a radial direction thereof; and a second stop protrusion protruded from an outer circumferential surface of the second bush member, wherein the protrusion of the shaft during rotation of the shaft slides against the step surface and contacts with the first stop protrusion, to thereby rotate the stopper, and the second stop protrusion contacts with a protrusion fixed to a housing of a robot rotary articulation to thereby stop rotation of the shaft and stopper.

BRIEF DESCRIPTION OF THE DRAWINGS

The above object and advantages of the present invention will become more apparent by describing in detail a preferred embodiment thereof with reference to the attached drawings in which:

FIG. 1 is a sectional view of a robot rotary articulation having a conventional stopper;

FIGS. 2 and 3 are sectional views showing the operation of the stopper of the robot rotary articulation shown in FIG. 1;

FIG. 4 is a perspective view showing another structure of a conventional stopper;

FIGS. 5A and 5B are perspective views showing a stopper of a robot rotary articulation, according to the present invention;

FIGS. 6A, 7A, 8A and 9A are front views showing operation of the stopper of the robot rotary articulation according to the present invention;

FIGS. 6B, 7B, 8B and 9B are rear views showing operation of the stopper of the robot rotary articulation, according to the present invention; and FIG. 10 is a view showing another embodiment of the present invention and is similar to FIG. 9B.

FIG. 11 is a sectional view showing a robot rotary articulation system having a stopper in accordance with the invention.

DETAILED DESCRIPTION OF THE INVENTION

Referring to FIGS. 5A and 5B, a stopper 100 according to the present invention includes a first bush member 101, which is ring-shaped, and a second bush member 102 having a diameter smaller than that of the first bush member 101 and tightly connected to the inner surface of the first bush member 101 in order to have a step surface 102a forming a step against the first bush member 101. The first bush member 101 and the second bush member 102 can be formed in one body.

The inside of the first bush member 101 has a first stop protrusion 103 extending in a radial direction thereof on the step surface 102a of the second bush member 102.

From the outer circumferential surface of the second bush member 102, a second stop protrusion 104 protrudes to form a step against the first bush member 101.

Operation of the above described stopper of the robot rotary articulation according to the present invention will be described, with reference to FIGS. 6A through 11. Here, like reference characters designate like components shown in the above description.

In FIGS. 6A and 6B, a shaft 200 inserted into the stopper 100 is shown, supposing that each angle of a rotary protrusion 201 formed on the shaft 200 and a fixing protrusion 300 fixed on a housing 290 (FIG. 11) (not shown) is 10 degrees, and each angle of the first and second stop protrusions 103 and 104 is 60 degrees, respectively.

When the shaft 200, as shown in FIGS. 7A and 7B, rotates clockwise by 145 degrees, the rotary protrusion 201 contacts the first stop protrusion 103, and thus the stopper 100 also rotates clockwise with the shaft 200, as shown in FIGS. 8A and 8B. Here, according to the present invention, the rotary protrusion 201 contacts both an inner circumferential surface 101a of the first bush member 101 and the step surface 102a of the second bush member 102, shown in FIG. 5A, and the outer circumferential surface 102b of the second bush member 102, shown in FIG. 5B, also contacts with the fixing protrusion 300 fixed to the housing. Accordingly, the shaft 200 can stably rotate, being supported by the rotary protrusion 201 and the fixing protrusion 300.

Then, as shown in FIGS. 9A and 9B, when the shaft 200 rotates clockwise by 290 degrees, it cannot rotate any further because the second stop protrusion 104 contacts the fixing protrusion 300 fixed to the housing 290.

On the contrary, in the case the shaft 200 rotates counterclockwise, the same operation as above can be applied. Accordingly, since the shaft 200 can rotate by ±290 degrees, an operation region of 580 degrees can be ensured.

Meanwhile, a plurality of screw holes 105 are formed on the step surface 102a of the second bush member 102 of FIG. 5A, and a bolt 400 is selectively engaged according to a desired operation angle as shown in FIG. 10, to thereby control the rotation angle of the shaft 200.

Also, a screw hole 106, shown in FIG. 5B, for controlling the rotation angle of the first bush member 101 can be formed.

As described above, according to the stopper of the robot rotary articulation of the present invention, the rotary articulation can ensure the operation region of 360 degrees or more.

Also, since the stopper, contacting the shaft, is supported by the rotary protrusion and the fixing protrusion, the stopper can be prevented from slanting with respect to the axis direction and fitting tightly to the axis during rotation, and thus operation failure is prevented.

What is claimed is:

1. A stopper for robot rotary articulation, for limiting the rotation angle of a shaft where a protrusion is formed comprising:

a first ring-shaped bush member;

a second bush member, having an inner diameter smaller than that of said first bush member, connected to an inner circumference of said first bush member to form a step surface against said first bush member, and rotatably supported by inserting said shaft therein;

a first stop protrusion extending from an inner surface of said first bush member in a radial direction thereof; and a second stop protrusion protruded from an outer circumferential surface of said second bush member, wherein the protrusion of said shaft during rotation of said shaft slides against said step surface and contacts with said first stop protrusion, to thereby rotate said stopper, and said second stop protrusion contacts with a protrusion fixed to a housing of a robot rotary articulation to thereby stop rotation of said shaft and stopper, and wherein a plurality of screw holes are formed on the step surface and a bolt is selectively engaged with said screw holes, to thereby control the rotation angle of said stopper.

2. A stopper for a robot rotary articulation according to claim 1, wherein said first and second bush members are integrally formed.

3. A stopper for robot rotary articulation for limiting the rotation angle of a shaft where a protrusion is formed comprising:

a first ring-shaped bush member;

a second bush member, having an inner diameter smaller than that of said first bush member, connected to an inner circumference of said first bush member to form a step surface against said first bush member, and rotatably supported by inserting said shaft therein;

a first stop protrusion extending from an inner surface of said first bush member in a radial direction thereof; and a second stop protrusion protruded from an outer circumferential surface of said second bush member, wherein the protrusion of said shaft during rotation of said shaft slides against said step surface and contacts with said first stop protrusion, to thereby rotate said stopper, and said second stop protrusion contacts with a protrusion fixed to a housing of a robot rotary articulation to thereby stop rotation of said shaft and stopper, and wherein a plurality of screw holes are formed on a step surface of said second bush member and a bolt is selectively engaged with said screw holes, to thereby control the rotation angle of said stopper, and a plurality of screw holes are formed on said first bush member in order to control the rotation angle thereof.

* * * * *